United States Patent [19]

Fernandez et al.

[11] Patent Number: 4,893,305

[45] Date of Patent: Jan. 9, 1990

[54] INBAND DYNAMIC PORT ALLOCATION

[75] Inventors: Raul F. Fernandez, Miami; Ignacio Urbieta, Jr., Miami Lakes, both of Fla.

[73] Assignee: Racal Data Communications Inc., Sunrise, Fla.

[21] Appl. No.: 175,871

[22] Filed: Mar. 31, 1988

[51] Int. Cl.[4] .......................... H04J 3/22; H04B 1/38; H04L 5/16

[52] U.S. Cl. ......................................... 370/84; 375/8; 370/31

[58] Field of Search ....................... 370/84, 95, 89, 31, 370/29, 24; 375/7, 8

[56] References Cited

U.S. PATENT DOCUMENTS

| | | | |
|---|---|---|---|
| 3,781,818 | 12/1973 | Pardoe et al. | 370/84 |
| 4,270,202 | 5/1981 | Stuttard et al. | |
| 4,477,898 | 10/1984 | Cholat-Namy | 370/84 |
| 4,599,719 | 7/1986 | Breen et al. | 370/31 |
| 4,622,685 | 11/1986 | Dhawan et al. | |

OTHER PUBLICATIONS

C.C.I.T.T. Draft Recommendation V.33, date unknown.

*Primary Examiner*—Robert L. Griffin
*Assistant Examiner*—Wellington Chin
*Attorney, Agent, or Firm*—Jerry A. Miller

[57] ABSTRACT

A multi-port (multiplexed) modem for implementing automatic reconfiguration of the ports so that transmission bandwidth can be optimized. The modem utilizes a sequence of communications and acknowledgments transmitted over the donor port donating the bandwidth and the recipient port receiving the bandwidth. This allows reconfiguration of the modem ports without need for interruption of the unaffected ports and requires no secondary channel to implement. Only the port going idle and the port receiving the bandwidth are affected so that communication channel throughput is maximized and unaffected ports are not interrupted.

20 Claims, 4 Drawing Sheets

INBAND DYNAMIC PORT ALLOCATION

BACKGROUND

1. Field of the Invention

The subject invention relates generally to digital data communications and more particularly to an apparatus employing multiplexing to combine a plurality of digital data channels for transmission over a single transmission path. The invention provides an apparatus for automatically varying the channel configuration and is particularly useful in conjunction with digital data modems.

2. Background of the Invention

Digital data modems are commonly used for interfacing with data processing apparatus at either end of a transmission channel such as a telephone line. Multiport modems are also known which provide a plurality of channels for communication with a similar plurality of channels of the associated data processing apparatus. The multiple channel information is multiplexed for transmission over an individual line. Multiplexing is typically accomplished by TDM (time division multiplexing) with bit-by-bit or word-by-word interlacing of data from each data port to a single aggregate channel. Of course, many methods of multiplexing are known and could possibly be used according to the invention.

In initiating communication across a transmission line between modems, generally a sequence of initializing signals are generated in what is sometimes referred to as a "handshaking" operation. Such signals may indicate when a data source actually wants to transmit data or wants a channel at its disposal ready for transmission. An example of the former alternative currently in use is RTS (request to send or ready for sending). An example of the second alternative is DTR (data terminal ready). RTS is present only while a transmission is in progress, while DTR will be present throughout the time that the data source is engaged in interactive communication with a device such as a CPU. It is also known that DCD (data carrier detect) is not only provided in the presence of a data carrier from a communicating modem, but it is also set high or low upon receipt of a coded RTS signal.

Known multi-port modems contain the necessary circuitry for switching between various port configurations in response to commands set manually by an operator. Such channel allocation or port reconfiguration is useful when data traffic patterns differ relatively infrequently in a known manner. It is then possible to set up a mode switching schedule which requires the intervention of an operator from time to time to effect mode changes. Moreover the actions of two operators, one manually operating a modem at each end of the transmission line, must generally be coordinated. To make more efficient use of the expensive telephone channels, it is desirable to have a dynamic port reconfiguration capability wherein the data processing apparatus and modem system would cooperate to reconfigure ports rapidly and automatically without operator intervention.

U.S. Pat. No. 4,270,202 to E. B. Studdard et al., and assigned to the assignee of the present invention, describes circuitry for automatically and dynamically reconfiguring the channel or port configuration of a modem handling a plurality of ports. In this patent, standard signals such as DTR (data terminal ready) are used to provide a code to a master modem indicating the particular port configuration requested by a cooperating apparatus. The requested configuration code is continuously compared to a code stored by a shift register controlling the actual modem port configuration. When the requested code changes, an indication of the code change is transmitted to a communicating slave modem. A control signal is sent, after a suitable delay, to the shift register to conform its contents to the newly requested configuration code. During the delay, the slave modem switches to the newly requested configuration. The circuitry follows a defined sequence of configuration switching, dropping channels successively and adding channels by passing through the state where all channels are active. In an alternative system operation, each of two communicating modems may be synchronized by the cooperating apparatus such that a configuration change need not be communicated across the transmission line.

The Omnimode ® series of modems manufactured by Racal-Milgo division of Racal Data Communications, Inc., the assignee of the present invention, uses a secondary channel (out of band) for dynamic port allocation of the bandwidth of a port when it becomes idle or to reallocate the same when the idle port becomes active. In this system the master unit and the remote unit are not synchronized in implementing the port reconfiguration; consequently, data errors are introduced upon such change.

In the C.C.I.T.T.V.33 recommendation, an interruptive retraining is used to transmit modem speed and one of a limited number of possible multiplexer configuration when configuration change is desired. This requires interruption of the aggregate channel, and thus unaffected ports, for several seconds.

U.S. Pat. No. 4,622,685 to Dhawan et al., and also assigned to the assignee of the present invention, describes an RTS/DCD simulator for use in a data modem to simulate these signals by transmission of predetermined codes. This technique has been used in both scrambled and unscrambled form commercially. RTS and DCD simulation for modem communication has also been described and specified by the C.C.I.T.T. modem specification V.33.

SUMMARY OF THE INVENTION

It is an advantage of some embodiments of the present invention to reconfigure modem port configurations without manual intervention for coordinating the reconfiguration and with minimal interruption.

It is another advantage of some embodiments of the invention to automatically coordinate multi-port mode switching at two modems linked by a transmission path.

It is a further advantage of some embodiments of the present invention to automatically coordinate port configurations using the available bandwidth being reallocated.

It is another advantage of some embodiments to provide an inband technique for port reconfiguration which does not require use of a low speed secondary channel and which has minimal interruption of user data.

It is a further advantage of some embodiments of the invention to enable dynamic port reconfiguration, allowing a modem or multiplexer to adapt to changing traffic patterns flexibly and in an unscheduled manner so as to obtain the optimum use of available bandwidth at any given time.

These and other objects and advantages of the invention will become apparent to those skilled in the art upon consideration of the following description of the invention.

In one embodiment of a multi-port modem according to the present invention, a method of allocating bandwidth from a donor port to a recipient port which is to have its bandwidth allocation increased without interrupting other ports in the modem, the multi-port modem being of the kind that transmits and receives data from a plurality of ports using time division multiplexing so that each port uses one or more time slots for data transmission, and wherein the aggregate data are transmitted over a transmission medium. The method comprises the steps of transmitting a code over the donor port time slot to signify that said donor port is idle; coordinating a change in transmission rate of said recipient port by transmitting a handshaking protocol over the time slots of the idle donor port and the recipient port; and reconfiguring the multi-port modem to allocate the bandwidth of the donor port to the recipient port without interruption of the other ports. In the preferred embodiment, the coordinating step further includes the steps of transmitting a drop code over the donor port; transmitting a multiplexer configuration code; transmitting a synchronization code over the recipient port to synchronize reconfiguration of the other ports if required; transmitting an upcode over the recipient port at an increased data rate; and transmitting data at the increased data rate over the recipient port.

In another embodiment of the multi-port modem of the present invention, a method of allocating bandwidth to a recipient port from a donor port which is to have its bandwidth decreased without interruption of other ports of the modem, the multi-port modem being of the kind that transmits and receives data from a plurality of ports using time division multiplexing so that each port uses one or more time slots for data transmission, and wherein the aggregate data are transmitted over a transmission medium comprises the steps of receiving a request for bandwidth from an idle recipient port; coordinating a change in bandwidth allocation by transmitting a handshaking protocol over the donor port time slot and the recipient port time slot to signify that the port is to relinquish bandwidth to the port requesting bandwidth; and reconfiguring the multi-port modem to allocate the bandwidth to the recipient port from the donor port without interruption of the other ports. In the preferred method the coordinating step further comprises the steps of transmitting a drop code over the donor port's allocated bandwidth; transmitting a multiplexer configuration code over said donor port; transmitting a synchronization code to synchronize a reconfiguration of the other ports if necessary; transmitting an upcode over the donor port and the recipient port; and transmitting donor port data over the donor port and recipient port data over the recipient port.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

For purposes of this document, the term "donor" refers to the port, device or channel which is donating bandwidth for example by going idle or by a reduction in transmission rate. The term "recipient" refers to the port, device or channel which is receiving the bandwidth from the donor port. The recipient increases its bandwidth allocation when it receives additional bandwidth from the donor which is going idle or reducing transmission rate. The designations "donor" and "recipient" are dynamic depending upon the current bandwidth change taking place so that a donor may become a recipient and vice versa.

Figure 1:
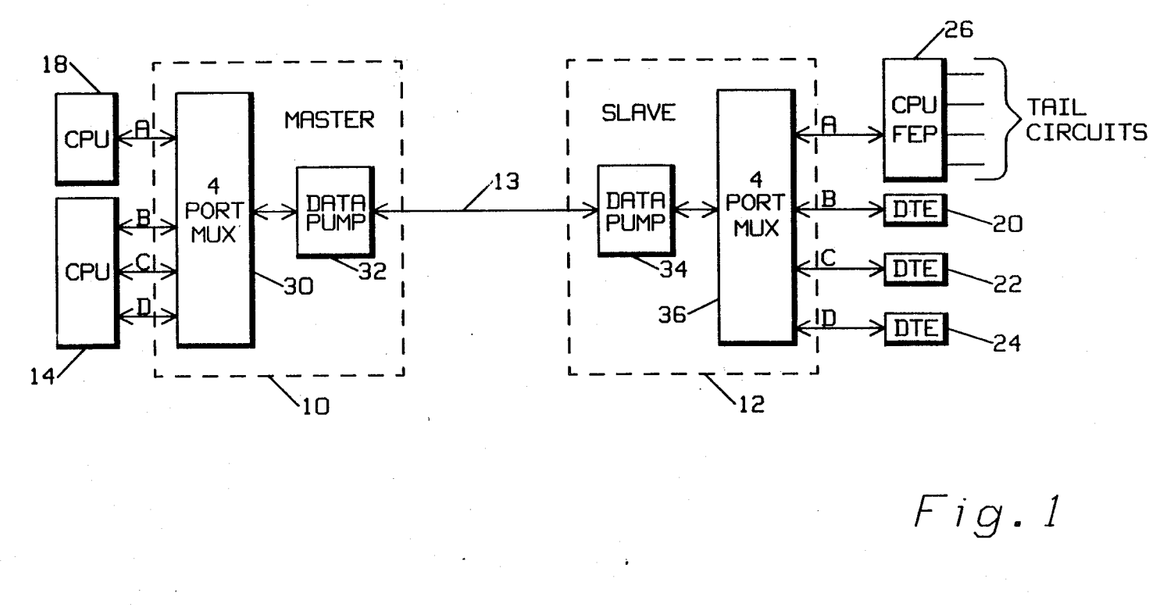
FIG. 1 shows an example of a four port multi-port modem configuration according to one embodiment of the present invention.

FIG. 1 illustrates one of the simpler embodiments of the present invention in which a pair of modems including a master modem 10 and a slave modem 12 communicate across a transmission channel 13. The designations of master and slave are common in high speed modems and in general mean the controlling side modem (master) and the controlled side modem (slave). In the present embodiment, each modem 10 and 12 interfaces with a data processing apparatus such as a central processor, data terminal or other peripheral. For example, master modem 10 may interface with a port of a central processing unit 14 and a port of a central processing unit (CPU) 18 while modem 12 interfaces with a plurality of data terminal equipment (DTE) devices such as terminals 20, 22 and 24 as well as a third CPU 26 which serves as a front end processor for a number of tail circuits. In this example system, the ports are labeled A, B, C and D as shown and similarly labeled ports are coupled to one another through the communication system. In this example, let us assume that it is always desirable to designate that any available unused bandwidth created by any of ports B, C and D going idle is always to be directed to port A which is presumed to always be active. It will be noted, after later discussions that this is not to be limiting as any of a variety of conditions may be accommodated by the present invention. That is, the present invention is not limited to such a simple embodiment wherein a single port always receives any available unused capacity and wherein bandwidth is always made available by virtue of a port going idle.

As previously described, a multi-port modem multiplexes a plurality of channels for communication over a transmission line. For the present example assume that the multi-port modem 10 may multiplex four ports at a four port multiplexer (mux) 30, each transmitting at a maximum of 2400 bits per second (BPS) for an aggregate transmission rate of 9600 bits per second. The multiplexing may take place in a mux such as 30 as shown or may be handled by the bit to symbol mapping in a data pump 32 in other embodiments. In the first case, symbol sync is made available to the multiplexer to achieve maximum channel utilization as will be appreciated by those skilled in the art. The aggregate multiplexed data are transmitted over the channel 13 via the data pump 32. The cooperating slave modem 12 receives the aggregate data via data pump 34 and demultiplexes the single channel of information into the original four data channels, A, B, C and D at a demultiplexer 36. Typically a four wire line, two-way transmission system is utilized such that multiplex and demultiplex operations are performed at both ends of the transmission line, but this is not to be limiting. Similar scenarios are possible at any number of aggregate transmission rates such 14,440 BPS, 19,200 BPS, etc. and with differing numbers of ports. The four port 9600 BPS modems of FIG. 1 is only intended to be illustrative and is not to be considered limiting. The term "multiplexer" or "mux" as used herein includes a device which both multiplexes and demultiplexes (a multiplexer/demultiplexer) in general as will be clear from the context and general discussion.

In practice, it is often desirable to reconfigure the channel or port arrangement in order to increase the system's efficiency. For example, if two channels of a four port device are not currently necessary for transmitting data it is desirable to be able to effectively disable those two channels and allocate their bandwidth to one or more channels which are actively transmitting large amounts of data. In this manner, more efficient data transmission is achieved resulting in more cost effective use of the transmission media. In the example of FIG. 1, any capacity unused by ports B, C and D is transferred to port A as previously assumed.

In order to achieve this enhanced efficiency, Dynamic Port Allocation (DPA) according to the present invention increases network efficiency by adjusting port operating rates to make full use of the aggregate channel. This is accomplished in the present example by taking away unused channel bandwidth from idle ports and allocating it to other ports. As stated above, the port that accepts the additional bandwidth is called the recipient and the ports that give up the unused bandwidth are called the donors. In some embodiments it is possible that any of the ports may be selected to be the recipient port and any of the ports may be selected to be the donors depending upon the need at hand. The modem configuration may be altered as a function of the time of day, changes in capacity requirements, operator selection or any other suitable criteria. If any one of the ports become idle (or in the general case is able to give up some or all of its bandwidth), the additional bandwidth may be granted to a designated recipient port in one embodiment. However, if any of the deactivated donor ports resume activity the original bandwidth in that port may be re-allocated and thus removed from the original recipient port (so that the original recipient later becomes the donor and the original donor becomes the recipient).

The idle bandwidth allocation process for the master is as follows. When one of the donor master ports become idle (or is able to reduce its bandwidth), the master donor port transmits a sequence that includes a port drop code and a new multiplexer configuration. It then waits to receive from the remote unit a confirmation sequence that includes a drop sequence for that port (drop code plus new multiplexer configuration). Once the port drop sequence has been detected on both sides, the required multiplexer configuration changes are transmitted to the slave. After the multiplexer configuration is modified, the recipient master port then transmits a synchronizing sequence at the new rate and waits to receive a replying sequence indicating a successful connection. In the general case where a port is merely reducing bandwidth, that port may go idle for long enough to carry the handshaking for the reconfiguration.

The remote (slave) port, after receiving the drop code and new multiplexer configuration from the master port, replies with another drop code plus new multiplexer configuration. The multiplexer is then reconfigured to the new mux configuration. After the new mux configuration is asserted, the recipient remote port waits for a synchronization sequence from the master port. When received, the remote recipient port replies with another synchronization sequence indicating that the bandwidth allocation is complete.

The idle bandwidth allocation process for allocating bandwidth to a port which is idle but desires to become active (or is operating at a lower speed and wishes to increase its speed) is as follows. If activity is requested in one of the master's idle ports, the mux turns off the donor port using a sequence that includes a port drop code and a new multiplexer configuration and then waits to receive confirmation (drop code plus new multiplexer configuration) from the remote end. After completing the handshake, the required multiplexer configuration changes are made. Then, both the master donor and recipient ports, transmit a synchronizing sequence to re-initialize both channels.

At the remote (slave) modem 12, when the donor port (A) detects a drop code and new multiplexer configuration code from the master modem 10, it responds with a drop code and new multiplexer configuration. The required multiplexer configuration changes are then made. Then both, the remote donor and recipient ports, wait for the synchronizing sequence to come from the master modem 10. When received, they respond with another synchronizing sequence concluding a successful handshake.

Figure 2:
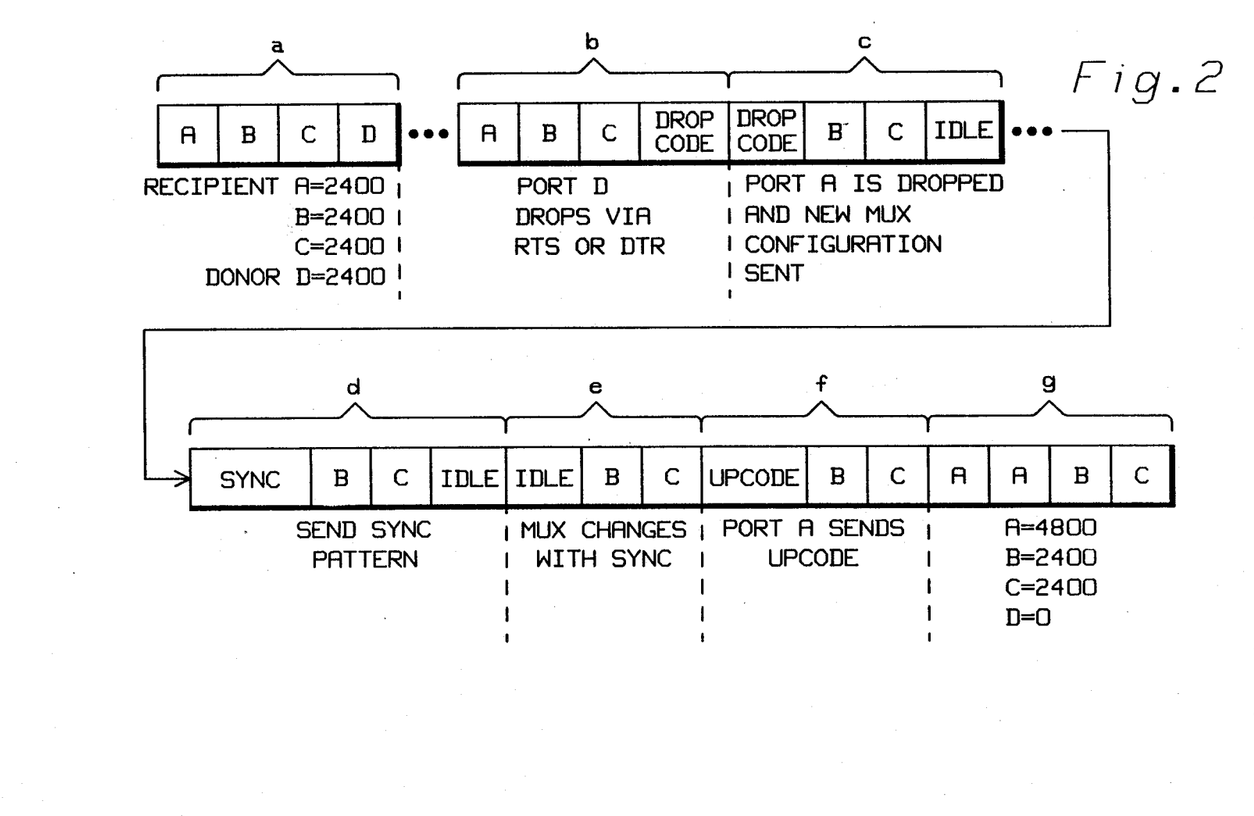
FIG. 2 is a diagram illustrating the signaling used in the process of allocation of bandwidth from port D to port A in the system of FIG. 1.

Turning now to FIG. 2, a diagram shows in detail one embodiment of the process of allocation of bandwidth from port D to port A of FIG. 1. This diagram is arranged to depict a frame of data consisting a four consecutive time slots and the rearrangement of the time slots to effect the desired reconfiguration. This diagram also assumes that this reallocation of bandwidth involves a change of bit to symbol mapping by the data pump but this is not to be limiting. That is, the data (time slots) are interleaved in the order ABCDABCD . . . when all four ports are active. When Port D is dropped and the reconfiguration is completed, the data are interleaved in the order AABCAABC . . . This is not to be limiting, however, since the present invention may equally well interleave the data as ABCAABCA . . . in other embodiments wherein the port allocation is transparent to the data pump. At 'a', all four channels are shown operating at 2400 BPS so that the ports are interleaved in the order ABCDABCD. . . . At 'b', the donor port D drops out by dropping RTS or DTR. Ports B and C continue to transmit in their normal time slots and are unaffected by this handshaking. When the donor port drops, a drop code such as a simulated RTS is transmitted in port D's time slot At 'c', port A is dropped and a drop code is transmitted in the slot formerly occupied by port A while an idle code is transmitted in the slot formerly occupied by port D.

At 'd', the data pump transmits a sync pattern in the slot formerly occupied by port A and an idle pattern is transmitted in the slot formerly occupied by port D. At 'e', the multiplexer shifts ports B and C over to the former time slots of ports C and D respectively and is idle in the ports formerly occupied by ports A and B. This transfer of the time slots of B and C is transparent to the users of these ports since there is no interruption. At 'f', port A sends an upcode and at 'g', port A occupies the slots formerly occupied by ports A and B for a total rate of port A of 4800 BPS. Ports B and C are operating at 2400 BPS each and port D is inactive.

This allocation process is interruptive only of the channel receiving the benefit of the reallocation of bandwidth and uses very little overhead to accomplish the change so that even frequent changes are possible with enhanced benefit to the recipient port. Further, the process uses a time slot (port) which has gone idle to coordinate the change so that no secondary channel is needed and no interruption of the unaffected channels is needed.

Figure 3:
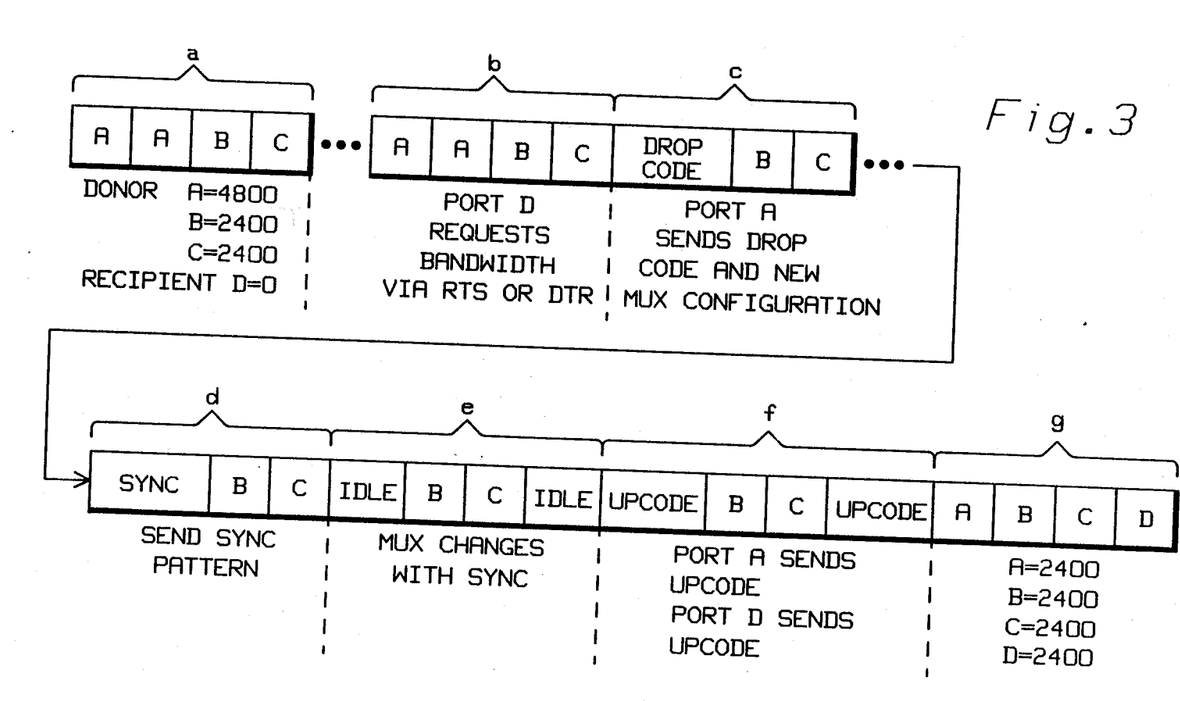
FIG. 3 is a diagram illustrating the signaling used in one embodiment of the process of allocation of bandwidth from port A to port D in the system of FIG. 1.

The process of allocating bandwidth from A to D is illustrated in detail in FIG. 3 for the example four port system having a total aggregate bandwidth of 9600 BPS as shown in FIG. 1. This example also assumes a change in bit to symbol mapping, but this is not to be limiting. This drawing depicts, from left to right, the process of allocation by showing the information transmitted in each of the four port slots designated A, B, C and D in a manner similar to that used in FIG. 1. In frame 'a' the donor port (A) has been allocated, as shown, 4800 bits per second of bandwidth by utilizing two of the four slots available in the frame. The ports B and C have been allocated 2400 BPS each by using one each of the four frame slots. Port D is currently inactive.

At 'b', port D requests bandwidth by raising RTS or DTR (either can be used to implement the present system). At 'c', port A is interrupted and a drop code such as a simulated RTS is transmitted by A in the slots usually occupied by data from port A. Transmission of the drop code may require more than one frame, as will be apparent to those skilled in the art. At 'd', the data pump sends a sync pattern along with a new mux configuration code in the slots previously used for port A. At 'e', the multiplexer changes synchronization for the two active channels shifting their slot locations as appropriate and the donor and recipient ports are idle. At 'f', ports A and D send an upcode to signify the start of the new configuration. At 'g', the modem has been completely reconfigured and is now transmitting 2400 BPS at each port.

Depending upon the speed with which the modems may implement the changes in multiplexer configuration, the diagram of FIG. 2 as well as FIG. 3 may require insertion of frames which include idle sequences in the time slots involved in the bandwidth reallocation to allow for processing time by the modems. These are readily implemented by those skilled in the art as needed.

Those skilled in the art will see that this allocation process is totally non-interruptive of data traffic on the channels which are only passively involved in the process (that is, B and C in this example). The only interrupted port is the port which has been receiving benefit of the bandwidth of the idle D port previously. Since the handshaking involved in the allocation process is very brief (on the order of tens of milliseconds or less for the 9600 BPS example shown) a net benefit to port A is attained due to the receipt of 2400 BPS of additional bandwidth even if the shifts in bandwidth allocation are frequent.

Figure 4:
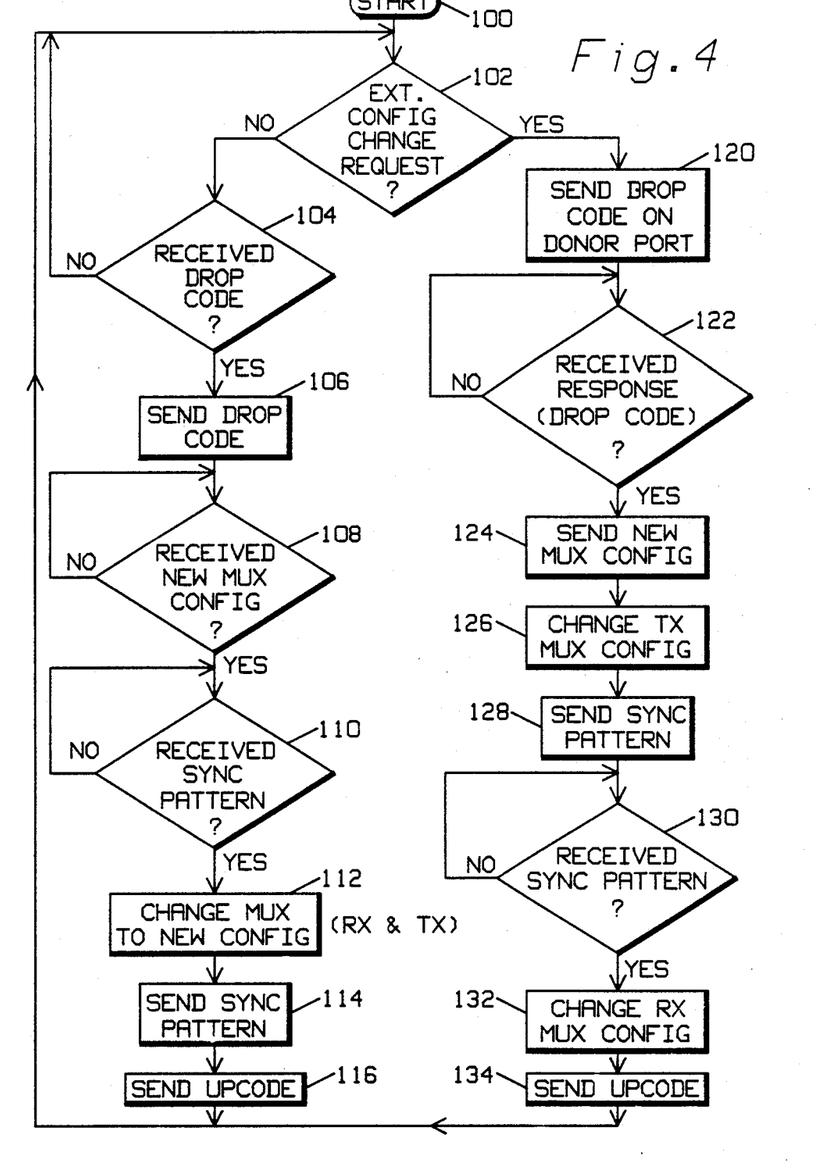
FIG. 4 is a flow diagram of the operation of the present invention.

Turning now to FIG. 4, a flow diagram of the present invention is shown. The process starts at 100 followed by 102 where it is determined whether or not an external change request has been received. This request can come from any number of sources such as a modem front panel, a network controller or the user. If no request has been received at 102 and no drop code is received at 104, the process loops through 102 and 104 until one or the other is received. If a drop code is received at 104, a reply drop code is transmitted at 106 at which point 108 waits for receipt of a new multiplexer configuration. When a new mux configuration is received at 108, step 110 waits for receipt of a sync pattern.

When the sync pattern is received at 110, the mux configuration is changed at 112. A sync pattern is transmitted at 114 and an upcode is transmitted at 116. At this point, control returns to 102 where the next change request is awaited.

When an external change request is received at 102, control passes to 120 which sends a drop code over the donor port. Control then passes to 122 where a response of a drop code is awaited. When the drop code is received at 122, control passes to 124 where a new mux configuration is transmitted. Then, at 126 the transmit mux configuration is changed and a sync pattern is transmitted at 128. Control then passes to 130 where receipt of a sync pattern is awaited. When the sync pattern is received at 130, control passes to 132 where the receive mux configuration is changed. An upcode is then sent at 134 and the process returns to 102.

The process just described requires no use of a secondary or signaling channel and requires minimal handshaking and interruption of data traffic. The only interruption which is actually required is an interruption of the channel which in all cases has gone idle or ultimately receives benefit of the donor port's bandwidth, thus negating any negative impact from interruption. The signaling required to achieve the reconfiguration of the multiplexer takes place predominantly over the donor channel which has just gone inactive. Thus, this bandwidth would normally be wasted until a reconfiguration could be instigated. This process maximizes utilization of available bandwidth while minimizing interference with existing communications and providing no interference with nonparticipating ports other than to gracefully shift their time slot.

The present invention has been described by use of a simple example in which the only criterion for port reconfiguration is that any idle port's bandwidth is to be allocated to a designated port. This is not to be limiting, however, since much more complex systems are possible. For example, the port configuration can be altered automatically by a modem controller as a function of time of day so that ports B and C are inactivated at 6:00 pm and ports A and D are each allocated 4800 bps (using for example a time slot pattern of AADDAADD . . . ). Later, for example at 10:00 pm, port A may be allocated an additional 2400 bps from D (using for example a time slot pattern of AAADAAAD . . . ). Similarly, much more complex systems are possible having, for example, eight or sixteen ports with an aggregate data rate of 19,200 bps.

Those skilled in the art will also appreciate that the embodiment described may be used in conjunction with reallocation of bandwidth. In the preferred method of this embodiment, the port which is donating bandwidth initially goes idle and its bandwidth is utilized to perform the handshaking functions described. The new mux configuration includes a smaller allocation of bandwidth for the donor port. Otherwise, the process is essentially identical and only the donor port is interrupted to facilitate the reallocation of bandwidth.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. In a multi-port modem, a method of allocating bandwidth from a donor port which is idle to a recipient port which is to have its bandwidth allocation increased without interrupting other ports in said modem, said multi-port modem being of the kind that transmits and receives data to and from a plurality of ports including said donor and recipient ports over a transmission medium using time division multiplexing so that each port uses one or more time slots for data transmission, and wherein the data are transmitted over said transmission medium, the method comprising the steps of:
   transmitting a code over said donor port time slot to signify that said donor port is idle;
   coordinating a change in transmission rate of said recipient port by transmitting a handshaking protocol over the time slots of said idle donor port and said recipient port; and
   reconfiguring said multi-port modem to allocate the bandwidth of said donor port to said recipient port without interruption of said other ports.

2. The method of claim 1, wherein said coordinating step further comprises the steps of:
   transmitting a drop code over said donor port to signal that said donor port is donating its time slot;
   transmitting a multiplexer configuration code over said donor port to specify a new multiplexer configuration;
   transmitting a synchronization code over said donor port to synchronize reconfiguration of said other ports if required; and
   transmitting an upcode to signal a start of transmission using said new multiplexer configuration over said donor and recipient ports.

3. The method of claim 2, wherein the step of transmitting said drop code includes the step of transmitting a simulated RTS or DTR code followed by transmitting a code indicating that dynamic port allocation is active.

4. The method of claim 2, wherein the step of transmitting said upcode includes the step of transmitting a simulated RTS or DTR code.

5. The method of claim 2, wherein said step of transmitting a synchronization code includes the step of transmitting a sequence of zeros followed by two ones.

6. In a multi-port modem, a method of allocating bandwidth to a recipient port which is currently idle from a donor port which is to have its bandwidth decreased without interruption of other ports of said modem, said multi-port modem being of the kind that transmits and receives data to and from a plurality of ports including said donor and recipient ports using time division multiplexing so that each port uses one or more time slots for data transmission, and wherein the data are transmitted over a transmission medium, the method comprising the steps of:
   receiving a request for bandwidth from an external source recipient port;
   coordinating a change in bandwidth allocation by transmitting a handshaking protocol over said donor port time slot and said recipient port time slot to signify that the port is to relinquish bandwidth to said port requesting bandwidth; and
   reconfiguring said multi-port modem to allocate the bandwidth to said recipient port from said donor port without interruption of said other ports.

7. The method of claim 6, wherein said coordinating step further comprises the steps of:
   transmitting a drop code over said donor port's allocated bandwidth to signal that said donor port is donating its bandwidth;
   transmitting a multiplexer configuration code over said donor port to specify a new multiplexer configuration;
   transmitting a synchronization code to synchronize a reconfiguration of said other ports if necessary; and
   transmitting an upcode to signal a start of transmission using said new multiplexer configuration over said donor port and said recipient port.

8. The method of claim 7, wherein the step of transmitting said drop code includes the step of transmitting a simulated RTS or DTR code followed by transmitting a code indicating that dynamic port allocation is active.

9. The method of claim 7, wherein the step of transmitting said upcode includes the step of transmitting a simulated RTS or DTR code.

10. The method of claim 7, wherein said step of transmitting a synchronization code includes the step of transmitting a sequence of zeros followed by two ones.

11. In a multi-port modem, a method of allocating bandwidth from a donor port which is to reduce its bandwidth to a recipient port which is to have its bandwidth allocation increased without interrupting other ports in said modem, said multi-port modem being of the kind that transmits and receives data to and from a plurality of ports including said donor and recipients ports over a transmission medium using time division multiplexing so that each port uses one or more time slots for data transmission, and wherein the data are transmitted over said transmission medium, the method comprising the steps of:
   transmitting a code over said donor port time slot to signify that said donor port is going idle;
   coordinating a change in transmission rate of said recipient port by transmitting a handshaking protocol over the time slots of said idle donor port and said recipient port; and
   reconfiguring said multi-port modem to allocate the bandwidth of said donor port to said recipient port without interruption of said other ports.

12. The method of claim 11, wherein said coordinating step further comprises the steps of:
   transmitting a drop code over said donor port to signal that said donor port is donating its time slot;
   transmitting a multiplexer configuration code over said donor port to specify a new multiplexer configuration;

transmitting a synchronization code over said donor port to synchronize reconfiguration of said other ports if required; and transmitting an upcode to signal a start of transmission using said new multiplexer configuration over said recipient port at an increased data rate.

13. The method of claim 12, wherein the step of transmitting said drop code includes the step of transmitting a simulated RTS or DTR code followed by transmitting a code indicating that dynamic port allocation is active.

14. The method of claim 12, wherein the step of transmitting said upcode includes the step of transmitting a simulated RTS or DTR code.

15. The method of claim 12, wherein said step of transmitting a synchronization code includes the steps of transmitting a sequence of zeros followed by two ones.

16. In a multi-port modem, a method of allocating bandwidth to a recipient port from a donor port which is to have its bandwidth decreased without interruption of other ports of said modem, said multi-port modem being of the kind that transmits and receives data to and from a plurality of ports including said donor and recipient ports using time division multiplexing so that each port uses one or more time slots for data transmission, and wherein the data are transmitted over a transmission medium, the method comprising the steps of:

receiving a request for bandwidth to be allocated to a recipient port;

coordinating a change in bandwidth allocation by transmitting a handshaking protocol over said donor port time slot and said recipient port time slot to signify that the port is to relinquish bandwidth to said recipient port; and reconfiguring said multi-port modem to allocate the bandwidth to said recipient port from said donor port without interruption of said other ports.

17. The method of claim 16, wherein said coordinating step further comprises the steps of:

transmitting a drop code over said donor port's to signal that said donor port is donating its time slot allocated bandwidth;

transmitting a multiplexer configuration code over said donor port to specify a new multiplexer configuration;

transmitting a synchronization code to synchronize a reconfiguration of said other ports if necessary; and transmitting an upcode to signal a start of transmission using said new multiplexer configuration over said donor port and said recipient port.

18. The method of claim 17, wherein the step of transmitting said drop code includes the step of transmitting a simulated RTS or DTR code followed by transmitting a code indicating that dynamic port allocation is active.

19. The method of claim 17, wherein the step of transmitting said upcode includes the step of transmitting a simulated RTS or DTR code.

20. The method of claim 17, wherein said step of transmitting a synchronization code includes the step of transmitting a sequence of zeros followed by two ones.

* * * * *